United States Patent [19]

Fröhler et al.

[11] Patent Number: 4,543,243
[45] Date of Patent: Sep. 24, 1985

[54] PROCESS AND A DEVICE FOR THE PRODUCTION OF CHLORINE DIOXIDE

[75] Inventors: Hanns Fröhler, Icking; Erwin Rossberger, Grossdingharting, both of Fed. Rep. of Germany

[73] Assignee: Dipl.-Ing. Hanns Fröhler, Icking, Fed. Rep. of Germany

[21] Appl. No.: 398,506

[22] Filed: Jul. 15, 1982

[30] Foreign Application Priority Data

Jul. 21, 1981 [DE] Fed. Rep. of Germany ....... 3128817

[51] Int. Cl.$^4$ .............................................. C01B 11/02
[52] U.S. Cl. .................................. 423/478; 423/475; 423/481
[58] Field of Search ................................ 423/477–480

[56] References Cited

U.S. PATENT DOCUMENTS

| | | | |
|---|---|---|---|
| 2,664,341 | 12/1953 | Kesting | 423/478 |
| 3,929,974 | 12/1975 | Winfield | 423/478 |
| 4,176,168 | 11/1979 | Goto | 423/478 |
| 4,191,620 | 4/1980 | Young | 423/234 |
| 4,294,815 | 10/1981 | Lohrberg et al. | 423/478 |
| 4,372,939 | 2/1983 | Bielz et al. | 423/478 |

FOREIGN PATENT DOCUMENTS

| | | | |
|---|---|---|---|
| 1049950 | 3/1979 | Canada | 423/478 |
| 0018670 | 10/1982 | European Pat. Off. | 423/478 |
| 831542 | 1/1952 | Fed. Rep. of Germany | 423/478 |
| 924689 | 2/1955 | Fed. Rep. of Germany | 423/478 |
| 971285 | 12/1958 | Fed. Rep. of Germany | 423/478 |

Primary Examiner—Earl C. Thomas
Attorney, Agent, or Firm—Felfe & Lynch

[57] ABSTRACT

The present invention provides a process for the continuous production of chlorine dioxide by the reaction of hydrochloric acid with an alkali metal chlorate solution, which is obtained by means of an electrolysis plant from a chlorate solution containing alkali metal chloride circulating in the process, together with cathodically-formed hydrogen, in a cascade reactor with the introduction of air, wherein the reaction of the alkali metal chlorate solution with the hydrochloric acid is carried out under reduced pressure and chlorine gas separated off from the reaction product is reacted with the cathodically-formed hydrogen with the introduction of external chlorine gas to give the required amount of hydrochloric acid.

The present invention also provides a device for carrying out this process, comprising at least one chlorate electrolysis plant, a cascade reactor, a separation column and a hydrochloric acid synthesis furnace, which are connected with one another by means of pipes according to the manner of operating the process, wherein a valve is provided in the air inlet pipe of the reactor, which valve is regulated corresponding to the pressure at the product outlet of the reactor.

5 Claims, 5 Drawing Figures

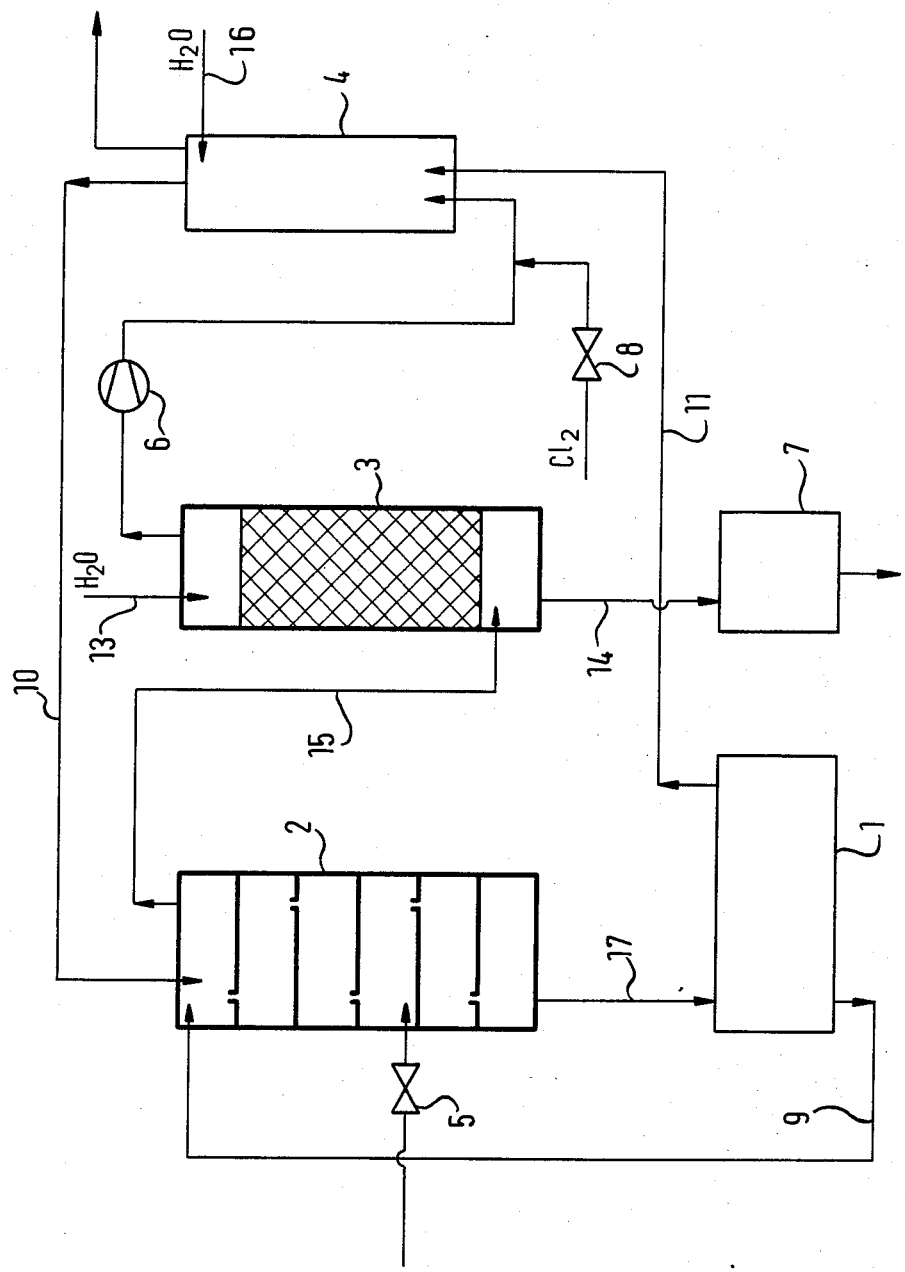

PROCESS AND A DEVICE FOR THE PRODUCTION OF CHLORINE DIOXIDE

The present invention is concerned with a process and a device for the production of chlorine dioxide, especially from chlorine as raw material.

For more than 30 years, the so-called Munich process has been known (see Federal Republic of Germany Patent Specification Nos. 831,542; 924,689 and 971,285) according to which chlorine dioxide is produced on a large scale in a manner which is environmentally acceptable and without waste materials being formed. According to this process, a chlorate solution produced by the electrolysis of a sodium chloride solution according to the equation:

$$NaCl + 3H_2O \rightarrow NaClO_3 + 3H_2 \qquad (1)$$

is reacted with hydrochloric acid in a 5- or 6-plate cascade column according to the equation:

$$NaClO_3 + 2HCl \rightarrow ClO_2 + \tfrac{1}{2}Cl_2 + NaCl + H_2O \qquad (2)$$

to give chlorine dioxide and chlorine. By the observance of defined conditions, the undesired side reaction according to the equation:

$$NaClO_3 + 6HCl \rightarrow 3Cl_2 + NaCl + 3H_2O \qquad (3)$$

is substantially suppressed. The solution flowing off from the reaction column is returned to the chlorate electrolysis plant without any further treatment. From the gas mixture obtained according to equations (2) and (3), which is diluted with air, the chlorine dioxide is obtained by absorption in cold water, together with dissolved chlorine, in a separation column and this chlorine dioxide solution is then used, for example, for bleaching cellulose.

Dilution of the gas mixture produced in the reaction column according to equations (2) and (3) is necessary for reasons of safety in order that the partial pressure of the chlorine dioxide does not substantially exceed 0.15 bar. Above this pressure, the gas mixture becomes increasingly unstable and, especially when the temperature increases, it can decompose explosively. Up to this partial pressure, the amount of heat liberated, even in the case of a possible decomposition of the chlorine dioxide, is low enough in order not to bring about a destructive disturbance of the course of the process and of the plant. This applies especially when the process is carried out in a cascade reactor because there the gas spaces are separated from one another.

The main amount of the chlorine formed internally in the reaction column or in the cascade reactor according to equations (2) and (3) is reacted, after passage through a separation column, together with the dilution air, in a hydrochloric acid synthesis furnace with the electrolysis hydrogen produced according to equation (1) to give hydrogen chloride. The oxygen present in the dilution air thereby largely uses up the electrolysis hydrogen with the formation of water.

The total reaction of the Munich process can, consequently, be represented by the following simplified equation:

$$HCl + 2\,0_{electrolysis} \rightarrow ClO_2 + \tfrac{1}{2}2H_2 \qquad (4)$$

However, under practical conditions, because of the hydrogen-consuming side reactions and because of the chlorine removed together with the chlorine dioxide, there is a slighter excess of hydrogen.

According to equation (4), as raw material for the production of chlorine dioxide by the Munich process, only hydrochloric acid is required, together with water for absorption. This process is conventional and appropriate when hydrogen chloride is readily available.

In cellulose production plants, chlorine, alternatively, is more readily available than hydrochloric acid. It is then necessary to produce hydrochloric acid in separate synthesis plant from chlorine and hydrogen, which are obtained, for example, with an alkali metal chloride electrolysis plant.

Thus, when chlorine can be made available more economically than hydrogen chloride, the hydrogen primarily produced according to equation (1) by the chlorate electrolysis is better utilised according to the following simplified equation:

$$\tfrac{1}{2}Cl_2 + 2\,0_{electrolysis} \rightarrow ClO_2 \qquad (5)$$

This is achieved by the process described in European Patent Specification No. 0018670 in which the current of air introduced into the reactor is at least partially replaced by a current of chlorine gas. The amount of chlorine gas thereby introduced is such that it suffices to cover the hydrogen chloride requirement of reactions (2) and (3).

In the case of this process, the externally introduced chlorine gas cannot be introduced directly into the hydrogen chloride furnace together with the internally produced chlorine gas emerging from the separation column because of the amount of air required for the dilution of the chlorine dioxide (in order to achieve a maximum partial pressure of 0.15 bar in the chlorine dioxide reactor). The amount of hydrogen produced by the electrolysis does not suffice for the combustion. The external chlorine gas must be introduced into the reactor in order to reduce the amount of dilution air. The gas mixture emerging from the reactor in the case of this process then contains about twice as much chlorine as chlorine dioxide, the separation of the components of the gas mixture in the separation column thereby being impaired and the proportion of chlorine dioxide removed from the separation column with the chlorine is correspondingly increased. The also higher chlorine content in the chlorine dioxide water is also most undesirable in the case of bleaching cellulose since it gives rise to soluble chlorinated products which increase waste water problems.

Another process, known from Canadian Patent Specification No. 1,049,950, is carried out under reduced pressure in a chlorine dioxide generator without feeding in air, i.e. in a single reactor without internal temperature gradient. The gas mixture produced contains chlorine dioxide, chlorine and water vapour and is free of air. Crystalline sodium chloride is precipitated out upon evaporating the solution in a vacuum, which is separated off by a special separation step, washed and, after dissolving in water, returned to the chlorate electrolysis plant. This laborious method of operating is necessary because, in the case of a direct return of the reaction solution from the chlorine dioxide generator (single vessel), too much unreacted hydrochloric acid is introduced into the chlorate electrolysis where it would give rise to dangerously high chlorine concentrations in the hydrogen (chlorine-oxygen-hydrogen explosive gas mixture) unless these not inconsiderable amounts of hydrochloric acid are neutralised by expensive aqueous sodium hydroxide solution and the sodium chloride hereby produced is then discarded. Thus, in the single reactor, in the case of the normal method of operating at about 60° C., there remain behind about 40 to 60 g. hydrogen chloride per litre of reaction solution and, in the case of still lower reaction temperatures, the content of hydrogen chloride is correspondingly higher. If the chlorine dioxide production is carried out in a single reactor at higher temperatures, i.e. at 60° to 100° C., then the yield according to equation (2) is lowered and the undesired reaction (3) increases. Furthermore, the precipitation of salt in the single reactor can lead to blockages at the outlet, resulting in an increased risk of decompositions. The feeding of hydrogen chloride gas into a chlorine dioxide generator directly from a hydrogen chloride plant is also very risky because the co-entrainment of excess hydrogen cannot be avoided, thereby resulting in a considerable danger of explosions.

Therefore, it is an object of the present invention to provide a process and a device for the continuous production of chlorine dioxide which permits the selective use of chlorine, for example from liquefied chlorine or as waste-product chlorine, instead of hydrochloric acid, without the above-mentioned disadvantages and without considerable expense for apparatus.

Thus, according to the present invention, there is provided a process for the continuous production of chlorine dioxide by the reaction of hydrochloric acid with an alkali metal chlorate solution, which is obtained by means of an electrolysis plant from a chlorate solution containing alkali metal chloride circulating in the process, together with cathodicallyformed hydrogen, in a cascade reactor with the introduction of air, wherein the reaction of alkali metal chlorate solution with the hydrochloric acid is carried out under reduced pressure and chlorine gas separated from the reaction product is reacted with the cathodically-formed hydrogen, with supplementation with external chlorine gas, to give the required amount of hydrochloric acid.

The reduced pressure is preferably regulated in such a manner that the operating pressure at the product outlet of the cascade reactor reaches an underpressure of 0.2 to 0.3 bar.

For carrying out the process according to the present invention, a cascade reactor is needed in which the temperatures increases stepwise on the 5 to 6 plates up to the boiling temperature of the reacting mixture in the following manner:

30°–35° C. above the first plate
48°–52° C. above the second plate
65°–72° C. above the third plate
78°–82° C. above the fourth plate boiling point above the fifth and sixth plates.

The result of this is that the chlorine dioxide has its highest concentration above the first plate, i.e. at a relatively low temperature, optimum yields of chlorine dioxide thereby being obtained. Furthermore, the danger of a destructive decomposition of the chlorine dioxide, such as exists at the higher temperatures in the single reactor, are completely excluded.

The introduction of air preferably takes place at the fourth plate of the cascade reactor and analogously the adjustment of the reduced pressure. The fifth and sixth plates, on the other hand, are at atmospheric pressure, whereby, independently of the vacuum on the first to the fourth plates, a boiling point of 105°–110° C. is achieved and the residual hydrochloric acid is brought to a content of 2 to 4 g./litre in the reacting solution. This is completely free of solids and is fed directly into the chlorate electrolysis plant. Its hydrogen chloride content just suffices to keep the pH at the desired range of 6.2 to 6.6. The vapour emerging from the fifth and sixth plates is passed over a condenser, the amount of water introduced with the concentrated hydrochloric acid thereby being partly removed; the remaining reaction gas mixture of chlorine, chlorine dioxide and water vapour enters plate 4 mixed with air.

According to a preferred embodiment of the present invention, the amount of air introduced into the cascade reactor is adapted to the chlorine dioxide product flow in such a manner that it corresponds to 2.3 to 3.2 times the chlorine dioxide flow, calculated as a volume flow. In this way, it is always possible, in a simple manner and without a considerable expenditure for control devices, to operate the chlorine dioxide production process in the cascade reactor in the safe region below a partial pressure of 0.15 bar and, on the other hand, in the hydrogen chloride synthesis furnace, to provide for a sufficiently large excess of hydrogen of at least 10% which, among other things, is necessary to avoid corrosion and material wear. For process- and safety-technical reasons, the excess of hydrogen must also be large enough to compensate for possible variations in the course of the process, for example in the case of a higher dilution of the chlorine dioxide reaction gas from the cascade reactor, for example to a partial pressure of 0.13 to 0.14 bar.

Without considerable effort, the cascade reactor can be designed for an underpressure of 0.3 bar above the first plate. A greater underpressure would require a stronger construction which, because of the higher material expenditure, especially for titanium, would result in a considerable increase of the prime costs.

For the control of the pressure, it has proved to be useful to provide, on the product outlet of the separation column, a pump for the production of the underpressure and to adjust the appropriate operating pressure by controlling the air feed into the reactor, which can take place, for example, by an appropriate valve in the air inlet pipe, which is controlled by the operating pressure on the reactor outlet. The dilution air for the reactor is preferably the flushing air withdrawn from the chlorine dioxide storage container. The amount by volume of the externally introduced chlorine can then, in turn, be regulated in dependence of the amount of chlorine dioxide removed from the plant.

Besides air and hydrogen chloride, the alkali metal chlorate solution is introduced directly from the electrolysis plant into the cascade reactor, preferably after filtering off insoluble material. The alkali metal is preferably sodium.

When the above-described preferred conditions are maintained, then the process only requires, apart from externally introduced chlorine, absorption water for the chlorine dioxide.

The present invention also provides a device for carrying out the process according to the present invention, comprising at least one chlorate electrolysis plant (1), a cascade reactor (2), a separation column (3) and a hydrochloric acid synthesis furnace (4) which are connected with one another by means of pipes according to the manner of operating the process, wherein a valve (5) is provided in the air inlet pipe of the reactor (2), which valve is regulated corresponding to the pressure at the product outlet of the reactor.

As already mentioned, the cascade reactor preferably has 5 to 6 plates, the air inlet pipe being connected with the fourth plate and the outlet pipe for the air-containing product current being arranged over the first plate.

The process according to the present invention and the device used for carrying it out are described in more detail in the following, with reference to the accompanying drawing.

Alkali metal chlorate and hydrogen are produced according to equation (1) in a chlorate electrolysis plant (1). The chlorate solution is dosed via pipe (9) into the uppermost reaction chamber of a cascade reactor (2) containing, for example, 6 plates and there reacted with concentrated hydrochloric acid which is introduced via pipe (10). The depleted chlorate solution leaving the lowermost plate of the reactor flows back into the electrolysis plant (1) via pipe (17).

Into the gas chamber of the fourth plate of the reactor, dilution air is sucked in via a control valve (5) and is mixed with vapour from the fifth and sixth plates and flows through the upper plates of the reactor. The gas mixture emerging from the reactor (2) at an underpressure of 0.2 to 0.3 bar, which consists of chlorine dioxide, chlorine, water vapour and dilution air, is passed via pipe (15) into the separation column (3) and there brought into solution with absorption water from pipe (13), the solution flowing via (14) into a storage tank (7). The unabsorbed residual gas mixture, which, besides the dilution air, mainly contains chlorine, passes, by means of a gas pump (6), with the addition of externally available chlorine, which is introduced via a control valve (8), into the synthesis furnace (4). It there undergoes combustion with the hydrogen from the electrolysis plant (1), fed in via (11), to give hydrogen chloride and water, which, with the addition of further absorption water via (16), is removed as concentrated hydrochloric acid.

According to the present invention, it is possible, without large expenditure for apparatus, to achieve the production of chlorine dioxide by the supply of chlorine, for example from liquefied chlorine or waste chlorine gas, instead of hydrochloric acid, without the disadvantages arising in the case of the abovedescribed known processes.

The following Example is given for the purpose of illustrating the present invention:

EXAMPLE

In a plant with a capacity of 7.5 tonnes per day of chlorine dioxide, from the chlorate electrolysis at 95.6% current yield and a current of 885 kA, there are obtained about 353 Nm$^3$ per hour of utilisable hydrogen. In a cascade reactor, there are reacted hourly 560 kg. sodium chlorate and 460 kg. hydrogen chloride to give 320 kg. chlorine dioxide and 280 kg. chlorine, which must be diluted with at least 475 Nm$^3$ of air in order not to exceed a 15% chlorine dioxide content in the water vapour-saturated gas mixture. The gas removed from the separation column, which still contains 245 kg. chlorine and 7 kg. chlorine dioxide, besides the dilution air, consumes 281 Nm$^3$ of hydrogen. Since the hydrogen chloride furnace must be operated under reducing conditions and, for process-technical reasons, there is needed a hydrogen excess related to the residual nitrogen content of the air, the utilisable hydrogen is, in the case of this method of operation, practically completely required.

However, when proceeding according to the process of the present invention, then, for example, at 0.2 bar underpressure over the first reaction plate, only 331 Nm$^3$ of dilution air are needed in order not to allow a partial pressure of the chlorine dioxide of 0.15 bar in the reaction gas mixture to be exceeded. In this way, it is possible to combust in the hydrogen chloride synthesis furnace at least 202.2 kg. additional chlorine which is introduced externally as gas. With this amount of chlorine, the whole internal consumption of hydrogen chloride for the reaction to give chlorine dioxide is met by the electrolysis hydrogen. Without the teachings of the present invention, hitherto the hydrochloric acid needed for the process had to be produced in a separate hydrogen chloride synthesis furnace, for example from hydrogen and chlorine originating from an alkali metal chloride electrolysis.

We claim:

1. A process for the continuous production of chlorine dioxide wherein
   (a) an alkali metal chlorate solution containing alkali chloride is reacted with hydrochloric acid to form a gaseous mixture of ClO$_2$ and Cl$_2$ and an alkali metal chloride solution depleted of chlorate, in a cascade reactor under an underpressure of 0.2 to 0.3 bar at the outlet of the cascade reactor, and a flow of air is introduced into the reactor to maintain a partial pressure of ClO$_2$ not exceeding 0.15 bar,
   (b) the gaseous mixture is passed into a separation column where ClO$_2$ is washed out with water to form a solution of ClO$_2$, and
   (c) the Cl$_2$ remaining after ClO$_2$ has been washed out of the gaseous mixture is reacted in an HCl synthesis furnace with hydrogen cathodically-formed in a chlorate-electrolysis plant, along with externally produced Cl$_2$, to give hydrochloric acid and the hydrochloric acid is introduced into the cascade reactor,
   (d) the alkali metal chloride solution depleted of chlorate is withdrawn from the outlet of the reactor and introduced into the chlorate-electrolysis plant forming chlorate and hydrogen therefrom, the chlorate solution is then recycled into the reactor and the hydrogen is introduced into the HCl-synthesis furnace.

2. Process according to claim 1, wherein the flow of air introduced into the cascade reactor corresponds to 2.3 to 3.2 times the chlorine dioxide product flow calculated as a volume flow.

3. Process according to claim 1 wherein the air flow into the cascade reactor is provided wholly or partly by flushing air withdrawn from chlorine dioxide storage containers.

4. Process according to claim 1, wherein the operating pressure on the outlet of the cascade reactor is adjusted by regulation of the air flow into the reactor.

5. Process according to claim 1, wherein the amount of external chlorine to be fed into the hydrochloric acid synthesis is regulated in dependence upon the amount of chlorine dioxide taken from the chlorine dioxide production plant.

* * * * *